United States Patent [19]

Furukawa et al.

[11] 4,451,602

[45] May 29, 1984

[54] ONE COMPONENT ROOM TEMPERATURE SETTING COMPOSITION

[75] Inventors: Hisao Furukawa; Yasushi Kato, both of Kobe, Japan

[73] Assignee: Kanegafuchi Kagaku Kogyo Kabushiki Kaisha, Osaka, Japan

[21] Appl. No.: 402,221

[22] Filed: Jul. 27, 1982

[30] Foreign Application Priority Data

Jul. 27, 1981 [JP] Japan ................................ 56-118354

[51] Int. Cl.$^3$ ....................... C08K 5/54; C08L 43/00; C08L 83/00
[52] U.S. Cl. .................................... 524/266; 524/114; 524/188; 524/264; 524/378; 524/357; 525/344; 525/370
[58] Field of Search ........................ 524/114, 188, 266

[56] References Cited

U.S. PATENT DOCUMENTS 4,043,953  8/1977  Chang et al. ...................... 526/279

Primary Examiner—Joseph L. Schoefer
Assistant Examiner—J. M. Reddick
Attorney, Agent, or Firm—Armstrong, Nikaido, Marmelstein & Kubovcik

[57] ABSTRACT

A one component room temperature setting composition having an excellent storage stability comprising a hydrolyzable silyl group-containing vinyl polymer, a hardener and a stabilizer selected from a hydrolyzable ester compound and a β-diketone compound, which may further contain a pigment and a solvent. The storage stability of the composition containing the hydrolyzable silyl group-containing vinyl polymer which is crosslinkable in the presence of water to harden at room temperature, can be remarkably improved by the presence of the above stabilizer.

5 Claims, No Drawings

ONE COMPONENT ROOM TEMPERATURE SETTING COMPOSITION

BACKGROUND OF THE INVENTION

The present invention relates to a novel one component room temperature setting composition having an excellent storage stability.

Compositions containing as a main component a urethane resin, an epoxy resin or a silicone resin have been known as room temperature setting compositions. They are used as paints, coating compositions, sealing materials, adhesives, casting materials, and the like. These room temperature setting compositions cause a crosslinking reaction at temperatures in the vicinity of room temperature to form cured coatings. Most of them are of a two component type that one component is admixed just before use with another component having a functional group capable of forming crosslinking points. In case of such a two component setting composition, a main component must be admixed with a hardener prior to the use in a predetermined ratio, and moreover, the mixture must be used up in a certain pot life, because the residue is hardened and is not usable later.

Two component setting compositions require troublesome work in weighing and admixing upon use, and also troubles such as error in weighing are liable to occur. From this point of view, one component setting compositions are convenient for use, and also are profitable in saving of resources.

Further, in many cases, room temperature setting compositions contain additives such as pigments, fillers, ultraviolet absorbents, antioxidants and other additives in accordance with the objects of use. It is known that chemical characteristics of pigments, water content, impurities and so on have a great influence on the storage stability and workability of the compositions and the physical properties of the cured products.

The present inventors already found that a vinyl polymer having a hydrolyzable silyl group on the polymer chain end or the side chain not only has excellent properties such as gloss, weathering resistance and discoloration resistance which are characteristic of vinyl polymers, but also has excellent features such as an improved close adhesiveness to inorganic materials based on the hydrolyzable silyl group, and in particular, a crosslinkability at ordinary temperature by water, especially moisture in the atmosphere to form a dense network structure, thus providing a resin having excellent solvent resistance, water resistance, heat resistance, hardness and weathering resistance, as disclosed in Japanese Unexamined Patent Publication (Tokkyo Kokai) No. 36395/1979.

The above-mentioned vinyl polymer having a hydrolyzable silyl group admixed with a hardener and a pigment is crosslinkable by moisture, and is expected to provide a one component type room temperature setting composition. However, this composition is very poor in storage stability (can stability or shelf life). The hydrolyzable silyl group-containing vinyl polymer causes hydrolysis of the silyl end group even in the absence of a hardener, if moisture is present, and hardens while gradually forming siloxane bonds. In particular, the addition of an additive such as pigment or filler thereto lowers the storage stability due to water included therein. For instance, inorganic pigments such as titanium dioxide, iron oxide and chrome yellow and other many organic pigments usually contain about 0.2 to about 1% by weight of water. The water content of a pigment such as an iron oxide glazing color or carbon black reaches 5 to 10% by weight. It is troublesome in working to dehydrate these pigments prior to use by heating under reduced pressure. Also, incorporation of water into a composition may occur even at the time of opening and closing of a container in repeated use of the composition. Therefore, in order to make the composition be of practical value, it is necessary that the composition can maintain the stable state even if a certain amount of water is incorporated therein.

The primary object of the present invention is to provide a one component room temperature setting composition having an excellent storage stability.

This and other object of the present invention will become apparent from the description hereinafter.

SUMMARY OF THE INVENTION

It has now been found that the storage stability of a composition containing a hydrolyzable silyl group-containing vinyl polymer, a hardener and a pigment can be raised to the extent that the composition does not cause any problem in practical use by adding a hydrolyzable ester compound and/or a $\beta$-diketone compound to the composition.

In accordance with the present invention, there is provided a one component room temperature setting composition which comprises:

(A) a vinyl polymer having on the polymer chain end or the side chain thereof at least one silyl group having a hydrolyzable group per one polymer molecule, the main chain of the vinyl polymer consisting essentially of a polymer of a vinyl compound, (B) 0.005 to 10 parts of a hardener, (C) 0 to 200 parts of a pigment, (D) 0.1 to 100 parts of at least one member selected from the group consisting of a hydrolyzable ester compound and a $\beta$-diketone compound, and (E) 0 to 500 parts of a solvent, said parts being parts by weight per 100 parts by weight of the component (A).

DETAILED DESCRIPTION

The hydrolyzable ester compound used in the present invention preferentially reacts with water included in the system in the presence of a hardener even at temperatures in the vicinity of room temperature, thus functions to remove water. Even water newly incorporated in the system is promptly removed. Although the reason for the stabilizing effect based on the $\beta$-diketone compound is not clear, it is considered that it causes the activity of a hardener to lower in storage in the closed state. These hydrolyzable ester compound and $\beta$-diketone compound evaporate at the time of drying and hardening after coating, whereby they are removed outside the system. Therefore, there is scarcely seen the phenomenon that they prevent the hydrolyzable silyl group-containing vinyl polymer from causing the crosslinking reaction.

The improvement of the storage stability according to the present invention includes, to say nothing of the improvement in the closed system, the improvement of pot life in the open system in the color matching work conducted usually over several hours.

A polymer of which the main chain consists essentially of a polymer of vinyl compounds and which has on the polymer chain end or the side chain thereof at least one silyl group combined with a hydrolyzable group, preferably at least two silyl groups combined with a hydrolyzable group, per polymer molecule, is used in the present invention as a component (A). The vinyl compounds include, for instance, styrene, acrylates, methacrylates, maleic anhydride, acrylamide, and the like, which may be employed alone or in admixture thereof. Most of the hydrolyzable silyl groups are represented by the following formula:

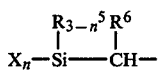

wherein X is a hydrolyzable group selected from the group consisting of a halogen, an alkoxyl group, an alkoxyalkoxyl group, an acyloxyl group, a ketoxymate group, amino group, an acid amide group, mercapto group and an alkenyloxy group, $R^5$ and $R^6$ are hydrogen or a hydrocarbon group having 1 to 10 carbon atoms selected from the group consisting of an alkyl group, an aryl group and an aralkyl group, and n is an integer of 1 to 3.

The vinyl polymer having a hydrolyzable silyl group used in the present invention is prepared in a known manner as disclosed in Japanese Unexamined Patent Publication (Tokkyo Kokai) No. 36395/1979, No. 123192/1979 and No. 63351/1982. The hydrosilylation reaction of a vinyl polymer having a carbon-carbon double bond and a hydrosilane and the copolymerization of a vinyl compound and a silyl compound having a polymerizable double bond are industrially advantageous as a process for the preparation of the hydrolyzable silyl group-containing vinyl polymer. The hydrolyzable silyl group-containing vinyl polymers disclosed in the above publications are usable in the present invention as a component (A).

The hydrolyzable silyl group-containing vinyl polymer is desired to have a number average molecular weight within the range of 1,000 to 30,000, though the molecular weight thereof is not particularly limited thereto. In the case where attention must be paid particularly to the storage stability, it is more desirable to use the hydrolyzable silyl group-containing vinyl polymer having a number average molecular weight of 1,000 to 10,000.

The hydrolyzable silyl group-containing vinyl polymer containing units of a vinyl compound as a comonomer which has active hydrogen, e.g. carboxyl group, hydroxyl group, amino group and acid amido group, shows a further improved close adhesion property to a substrate. The content of such a comonomer is usually from 0.1 to 10% by weight.

Compounds known as hardeners for usual hydrolyzable silyl group-containing compounds can be used in the present invention as a hardener (B) for the component (A). Examples of the hardener are, for instance, alkyltitanates; acidic compounds such as phosphoric acid, p-toluenesulfonic acid and phthalic acid; amine compounds, e.g. aliphatic diamines such as ethylenediamine and hexamethylenediamine, aliphatic polyamines such as diethylenetriamine, triethylenetriamine and tetraethylenepentaamine, alicyclic amines such as piperidine and piperazine, aromatic amines such as m-phenylenediamine, ethanolamine, triethylamine, and various modified amine compounds used as hardeners for epoxy resin; organic tin compounds, e.g. organic tin carboxylate compounds such as compounds of the following formulas:

(n—$C_4H_9$)$_2$Sn(OCO—n—$C_{11}H_{23}$)$_2$
(n—$C_4H_9$)$_2$Sn(OCOCH=CHCOOCH$_3$)$_2$
(n—$C_4H_9$)$_2$Sn(OCOCH=CHCOO—n—$C_4H_9$)$_2$
(n—$C_8H_{17}$)$_2$Sn(OCO—n—$C_{11}H_{23}$)$_2$
(n—$C_8H_{17}$)$_2$Sn(OCOCH=CHCOOCH$_3$)$_2$
(n—$C_8H_{17}$)$_2$Sn(OCOCH=CHCOO—n—$C_4H_9$)$_2$
(n—$C_8H_{17}$)$_2$Sn(OCOCH=CHCOO—iso—$C_8H_{17}$)$_2$
Sn(OCO—n—$C_8H_{17}$)$_2$ organic tin mercaptide compounds such as compounds of the following formulas:

(n—$C_4H_9$)$_2$Sn(SCH$_2$COO)
(n—$C_4H_9$)$_2$Sn(SCH$_2$COO—iso—$C_8H_{17}$)$_2$
(n—$C_8H_{17}$)$_2$Sn(SCH$_2$COO)
(n—$C_8H_{17}$)$_2$Sn(SCH$_2$CH$_2$COO)$_2$
(n—$C_8H_{17}$)$_2$Sn(SCH$_2$COOCH$_2$CH$_2$OCOH$_2$S)$_2$
(n—$C_8H_{17}$)$_2$Sn(SCH$_2$COOCH$_2$CH$_2$CH$_2$CH$_2$OCOH$_2$S)
(n—$C_8H_{17}$)$_2$Sn(SCH$_2$COO—iso—$C_8H_{17}$)$_2$
(n—$C_8H_{17}$)$_2$Sn(SCH$_2$COO—n—$C_{12}H_{25}$)$_2$

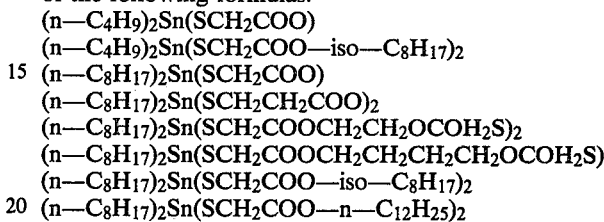

organic tin sulfido compounds such as compounds of the following formulas:

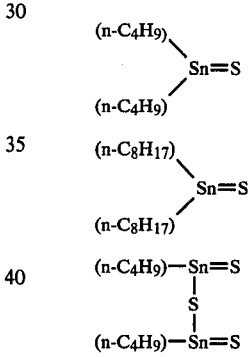

organic tin oxides such as (n—$C_4H_9$)$_2$SnO and (n—$C_8H_{17}$)$_2$SnO, and reaction products of the organic tin oxides with ester compounds such as ethyl silicate, Ethyl Silicate 40 (commercial name of partially hydrolyzed ethyl silicate made by Nippon Unicar Co., Ltd.), dimethyl maleate, diethyl maleate, dioctyl maleate, dimethyl phthalate, diethyl phthalate and dioctyl phthalate; and the like. The hardener is employed in an amount of 0.005 to 10 parts by weight, preferably 0.1 to 8 parts by weight, per 100 parts by weight of the component (A).

The hydrolyzable ester compounds used in the present invention as a component (D) include orthoformic acid esters of the general formula:

HC(OR$^1$)$_3$ wherein $R^1$ is a monovalent hydrocarbon group having 1 to 16 carbon atoms such as an alkyl group, an aryl group, a halogenated alkyl group or a halogenated aryl group, hydrolyzable silicon compounds of the general formula:

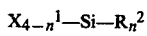

wherein $R^2$ is an organic group bonding to silicon atom through carbon atom, $X^1$ is a hydrolyzable group selected from the group consisting of an alkoxyl group, an alkoxyalkoxyl group, phenoxy group, an acyloxyl group, a ketoxymate group, amino group, aminoxy group, an acid amide group and an alkenyloxy group, and n is 0 or an integer of 1 to 3, and partial hydrolysis products of the hydrolyzable silicon compounds. The above orthoformic acid esters, hydrolyzable silicon compounds and the partial hydrolysis products thereof may be employed alone or in admixture thereof.

Typical examples of the orthoformic acid esters are methyl orthoformate, ethyl orthoformate, propyl orthoformate and butyl orthoformate.

Typical examples of the hydrolyzable silicon compounds and partial hydrolysis products thereof are methyl silicate, ethyl silicate, tetraacetoxysilane, methyltrimethoxysilane, vinyltrimethoxysilane, vinyltriethoxysilane, vinyltriacetoxysilane,

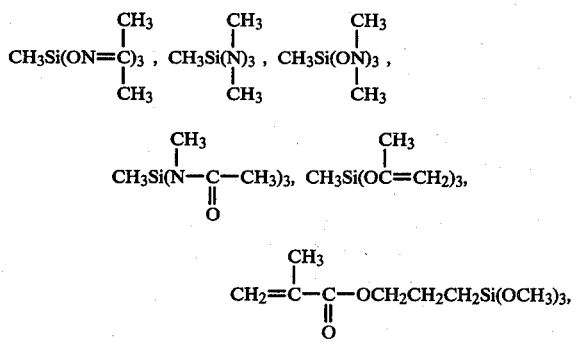

$H_2NCH_2CH_2CH_2Si(OC_2H_5)_3$,
$H_2NCH_2CH_2NHCH_2CH_2CH_2Si(OCH_3)_3$,
$H_2NCONHCH_2CH_2CH_2Si(OC_2H_5)_3$,

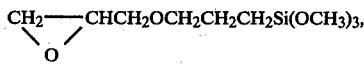

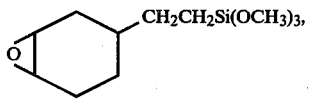

$HSCH_2CH_2CH_2Si(OCH_3)_3$, $\quad$ $CH_2CHSiCl_3$,
$ClCH_2CH_2CH_2Si(OCH_3)_3$, $\quad$ $CH_2=CHSi(OCH_3)_3$,
$CH_2=CHSi(OC_2H_5)_3$, $\quad$ $CH_2=CHSi(OCH_2$-$H_2OCH_3)_3$, Ethyl Silicate 40 (commercial name of partially hydrolyzed ethyl silicate made by Nippon Unicar Co., Ltd.) and HAS-1 (commercial name of partially hydrolyzed ethyl silicate made by Nippon Corcoat Co., Ltd.).

The β-diketone compounds used in the present invention as a component (D) are compounds of the general formula:

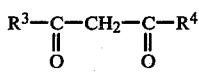

wherein $R^3$ and $R^4$ are a monovalent hydrocarbon group having 1 to 16 carbon atoms selected from the group consisting of an alkyl group, an aryl group, a halogenated alkyl group and a halogenated aryl group.

Typical examples of the β-diketone compound are, for instance, acetylacetone,

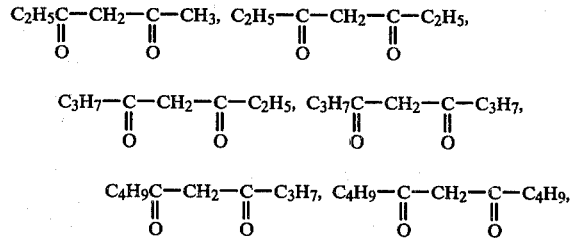

and the like.

The above-mentioned orthoformic acid ester, hydrolyzable silicon compound, partial hydrolysis product thereof and β-diketone compound may be employed alone or in admixture thereof as a component (D) in accordance with the kinds of the hydrolyzable group of the hydrolyzable silyl group-containing vinyl polymer, the hardener and the pigment and the object. For instance, in case that the hardener used is an acidic compound, the orthoformic acid esters are particularly effective. In case that the hardener used is an organic tin compound, the hydrolyzable silicon compounds and β-diketone compounds are particularly effective.

Although the amount of the component (D) varies depending on the water content of the system, it is usually selected from 0.1 to 100 parts by weight, preferably 1 to 50 parts by weight, per 100 parts by weight of the component (A).

The feature of the present invention resides in the use of the component (D) which reacts with water present in the composition or water which newly enters into the composition, in the presence of a hardener in preference to the hydrolyzable silyl group-containing vinyl polymer (A) so as to remove water present in the system or to lower the activity of the hardener by virtue of a certain interaction with the hardener, thereby improving the storage stability of the composition in the open or closed state. Further, since the component (D) is gradually removed by evaporation upon use, the pot life of the composition in the open or closed state is extended, so the workability is remarkably improved.

The component (D) is removed under usual hardening conditions, e.g. upon compulsory drying of the composition at temperatures within the range of room temperature to 80° C. Therefore, the component (D) does not prevent the component (A) from crosslinking, and the lowering of the physical properties of the cured product due to lack in curing is not seen.

The composition of the present invention may contain or not contain a solvent. As occasion demands, the composition may be diluted with a solvent in order to adjust the viscosity to usable one. The solvents are not particularly limited, and there are employed in the present invention, for instance, aliphatic hydrocarbons, aromatic hydrocarbons, alicyclic hydrocarbons, halogenated hydrocarbons, alcohols, esters, ketones, alcohol esters, alcohol ethers, ketone ethers, ketone esters and ester ethers. The kind and amount of the solvents are determined in accordance with the solubility, the evaporating rate, the viscosity of the composition and so on. The amount of the solvent is usually selected from 0 to 500 parts by weight per 100 parts by weight of the component (A).

The pigments which may be optionally employed in the present invention as a component (C), include, for instance, extender pigments such as calcium carbonate, kaoline, talc, clay, aluminum silicate, fumed silica and aerosol, inorganic pigments such as titanium dioxide, iron oxide, iron oxide glazing color, chrome yellow, cadmium oxide, ochre, carbon black and aluminum flake, and organic pigments, e.g. azo pigments such as permanent red and benzidine yellow, azo lake pigments such as watchung red and red bordo, phthalocyanine pigments such as phthalocyanine blue and phthalocyanine green, quinacridone pigments, and isoindolinone pigments.

The pigment is employed in an amount of 0 to 200 parts by weight, especially 1 to 200 by weight, per 100 parts by weight of the component (A). Pigments usually contain 0.2 to 1% by weight of water, and some pigments contain 5 to 10% by weight of water. Therefore, it is substantially impossible to provide a stable one component room temperature setting composition of the hydrolyzable silyl group-containing vinyl polymer unless the component (D) is employed.

Pigments have a great influence on the storage stability of the composition, and in particular, organic pigments which are smaller in particle size have a greater influence than inorganic pigments. According to the present invention, the dehydration of the pigment, e.g. drying under reduced pressure, is not particularly required. A composition having an excellent storage stability is obtained in a manner such that the pigment (B), the hardener (C) and the stabilizer (D) are admixed, if necessary, further with the solvent (E), and blended for a certain period of time by a suitable means to remove water from the system, and the hydrolyzable silyl group-containing vinyl polymer (A) is then added to the system and blended to disperse the pigment. This method is particularly effective for the case where organic pigments which are liable to exert a bad influence on the storage stability, are used. However, the method for the preparation of the composition is not limited to the above method. A satisfactory result can be obtained, even if the components (A), (B), (C) and (D) are blended and dispersed at one time.

The composition of the present invention may further contain plasticizers, antisagging agents, levelling agents, ultraviolet absorbents or antioxidants.

The one component room temperature setting composition of the present invention is curable at ordinary temperature or with heating at relatively low temperatures in the vicinity of 80° C. or lower, and provides cured products having excellent properties, e.g. close adhesion property and weathering resistance. Therefore, the composition of the invention is useful for the various purposes, e.g. paint, coating material, primer, adhesive and sealing material for the surfaces of inorganic materials such as iron, steel, tinplate, galvanized iron sheet, zinc, aluminum, glass, tile and slate, and organic materials such as wood, paper, cellophane, plastics and cured coatings of organic paints. The composition is particularly suitable as an anticorrosive finishing paint for a bridge and an automotive refinishing paint from the viewpoint of low temperature curing property, close adhesion property and weathering resistance.

It is possible to blend the composition of the invention in a wide range of proportions with commercially available resins, e.g. lacquer, acrylic lacquer, straight acrylic coating, thermosetting acrylic coating, alkyd coating, melamine coating and epoxy coating. The physical properties such as close adhesion property and weathering resistance of these paints or coatings can be improved by blending with the composition of the invention.

The present invention is more specifically described and explained by means of the following Examples in which all % are by weight unless otherwise noted. It is to be understood that the present invention is not limited to the Examples and various changes and modifications may be made in the invention without departing from the spirit and scope thereof.

The following Reference Examples are also presented to illustrate the preparation of the hydrolyzable silyl group-containing vinyl polymer used as a component (A) in the present invention.

REFERENCE EXAMPLE 1

To 50 g. of toluene heated at 120° C. was added dropwise under reflux over 5 hours a mixture consisting of 150 g. of styrene, 200 g. of butyl acrylate, 500 g. of methyl methacrylate, 150 g. of γ-methacryloylpropyltrimethoxysilane, 50 g. azobisisobutyronitrile, 180 g. of toluene and 180 g. of butyl acetate. A mixture of 10 g. of azobisisobutyronitrile and 50 g. of butyl acetate was further added dropwise to the system over 1 hour, and the post-polymerization was then conducted for 2 hours. The solid content of the obtained reaction mixture in the form of a solution was 69% by weight. The viscosity of the solution was 70 poises at 25° C. The thus prepared hydrolyzable silyl group-containing vinyl polymer had a number average molecular weight of 5,000 measured by gel permeation chromatography.

REFERENCE EXAMPLE 2

To 50 g. of toluene heated at 120° C. was added dropwise under reflux over 5 hours a mixture consisting of 150 g. of styrene, 200 g. of butyl acrylate, 480 g. of methyl methacrylate, 150 g. of γ-methacryloylpropyltrimethoxysilane, 20 g. of acrylamide, 50 g. of azoisobutyronitrile, 180 g. of toluene and 180 g. of butyl acetate. A mixture of 10 g. of azoisobutyronitrile and 50 g. of butyl acetate was further added dropwise over 1 hour, and the post-polymerization was then conducted for 2 hours to give a solution having a solid content of 68.5% by weight and a viscosity of 80 poises at 25° C. The thus prepared hydrolyzable silyl group-containing vinyl polymer had a number average molecular weight of 5,000.

REFERENCE EXAMPLE 3

To 50 g. of toluene heated at 120° C. was added dropwise under reflux over 5 hours a mixture consisting of 150 g. of styrene, 200 g. of butyl acrylate, 480 g. of methyl methacrylate, 150 g. of γ-methacryloylpropyltrimethoxysilane, 20 g. of maleic anhydride, 50 g. of azoisobutyronitrile, 180 g. of toluene and 180 g. of butyl acetate. A mixture of 10 g. of azoisobutyronitrile and 50 g. of butyl acetate was further added dropwise over 1 hour, and the post-polymerization was then conducted for 2 hours to give a solution having a solid content of 69% by weight and a viscosity of 75 poises at 25° C. The thus prepared hydrolyzable silyl group-containing vinyl polymer had a number average molecular weight of 5,000.

EXAMPLE 1

To 25 g. of the polymer solution obtained in Reference Example 1 were added 120 g. of titanium dioxide (commercially available under the commercial name "CR-90" made by Ishihara Sangyo Kaisha, Ltd.; water content 1%), 20 g. of xylene, 0.9 g. of dioctyl tin maleate (commercially available under the commercial name "TN 801" made by Sakai Chemical Industry Co., Ltd.) and 12.6 g. of ethyl silicate (EtSi). After blending them for 2 hours by a ball mill, 236 g. of the above-mentioned polymer solution and 253 g. of xylene were further added to the mixture and blended for 1 hour to give a one component room temperature setting composition in the form of a solution having a solid content of 45% and a viscosity of 25 centipoises at 25° C.

The obtained composition was sprayed onto a soft steel plate, and compulsorily dried for 30 minutes at 60° C. and a relative humidity (RH) of 10%. The coating was then allowed to stand for 3 days at 23° C. and 50% RH, and the physical properties thereof were measured.

On the other hand, a part of the composition was allowed to stand at 23° C. and 50% RH in the open state, and the time up to gelling was measured. Also, a part of the composition was placed in a container and allowed to stand at 50° C. for 1 month in the closed state. After measuring the viscosity of the thus stored composition, it was sprayed and dryed in the same manner as above and the physical properties of the coating were measured.

EXAMPLE 2

The procedure of Example 1 was repeated except that the polymer solution obtained in Reference Example 2 was employed to give a one component room temperature setting composition having a solid content of 45% and a viscosity of 30 centipoises at 25° C.

EXAMPLE 3

The procedure of Example 1 was repeated except that the polymer solution obtained in Reference Example 3 was employed to give a one component room temperature setting composition having a solid content of 45% and a viscosity of 30 centipoises at 25° C.

COMPARATIVE EXAMPLE 1

The procedure of Example 1 was repeated except that xylene was employed instead of ethyl silicate to give a composition having a solid content of 45% and a viscosity of 50 centipoises at 25° C.

EXAMPLE 4

To 130 g. of the polymer solution obtained in Reference Example 1 were added 30 g. of phthalocyanine blue (commercially available under the commercial name "Chromofine Blue 4940" made by Dainichiseika Color & Chemicals Mfg. Co., Ltd.; water content 1%), 74 g. of xylene, 1.2 g. of TN 801 (dioctyl tin maleate) and 16 g. of vinyltrimethoxysilane (VTS). After blending them for 6 hours by a ball mill, 204 g. of the above-mentioned polymer solution and 290 g. of xylene were further added to the mixture and blended for 1 hour to give a one component room temperature setting composition having a solid content of 35% and a viscosity of 25 centipoises at 25° C.

The obtained composition was sprayed onto a soft steel plate, and compulsorily dried for 30 minutes at 60° C. and 10% RH. The coating was then allowed to stand for 3 days at 23° C. and 50% RH, and the physical properties thereof were measured.

On the other hand, a part of the composition was placed in a container and allowed to stand at 23° C. and 50% RH in the open state, and the time up to gelling was measured. Also, a part of the composition was placed in a container and stored at 50° C. for 1 month in the closed state. After measuring the viscosity, the thus stored composition was sprayed and dried in the same manner as above and the physical properties of the coating were measured.

EXAMPLE 5

To 130 g. of the polymer solution obtained in Reference Example 1 were added 30 g. of phthalocyanine blue (commercially available under the commercial name "Chromofine Blue 4940" made by Dainichiseika Color & Chemicals Mfg. Co., Ltd.; water content 1%), 62.5 g. of xylene, 1.2 g. of TN 801 (dioctyl tin maleate), 16 g. of vinyltrimethoxysilane (VTS) and 11.5 g. of acetylacetone (AcAc). After blending for 6 hours by a ball mill, 204 g. of the above-mentioned polymer solution and 290 g. of xylene were further added and blended for 1 hour to give a one component room temperature setting composition having a solid content of 35% and a viscosity of 25 centipoises at 25° C. Thereafter, the properties were measured in the same manner as in Example 4.

EXAMPLE 6

In a ball mill, 40 g. of an azo lake red pigment (commercially available under the commercial name "Seikafast Red 1547" made by Dainichiseika Color & Chemicals Mfg. Co., Ltd.; water content 5%), 62.5 g. of xylene, 1.2 g. of TN 801 (dioctyl tin maleate) and 23 g. of ethyl silicate (EtSi) were blended for 1 hour. To the ball mill, 131 g. of the polymer solution obtained in Reference Example 2 and 11.5 g. of acetylacetone (AcAc) were added and blended for 6 hours, and 206 g. of the polymer solution and 299 g. of xylene were further added and blended for 1 hour to give a one component room temperature setting composition having a solid content of 35% and a viscosity of 30 centipoises at 25° C. Thereafter, the properties were measured in the same manner as in Example 4.

EXAMPLE 7

To 25 g. of the polymer solution obtained in Reference Example 3 were added 120 g. of titanium dioxide (commercially available under the commercial name "CR-90" made by Ishihara Sangyo Kaisha, Ltd.; water content 1%), 20 g. of xylene, 0.18 g. of p-toluenesulfonic acid (TS) and 12.6 g. of methyl orthoformate (OF). They were blended for 2 hours by a ball mill. To the mixture, 236 g. of the above-mentioned polymer solution and 253 g. of xylene were further added and blended for 1 hour to give a one component room temperature setting composition having a solid content of 45% and a viscosity of 30 centipoises at 25° C.

COMPARATIVE EXAMPLE 2

The procedure of Example 4 was repeated except that xylene was added instead of ethyl silicate to give a composition having a solid content of 45% and a viscosity of 100 centipoises at 25° C.

COMPARATIVE EXAMPLE 3

The procedure of Example 6 was repeated except that xylene was added instead of ethyl silicate and acetylacetone to give a composition having a solid content of 35% and a viscosity of 150 centipoises at 25° C.

COMPARATIVE EXAMPLE 4

The procedure of Example 7 was repeated except that xylene was added instead of methyl orthoformate to give a composition having a solid content of 45% and a viscosity of 50 centipoises at 25° C.

The results of the measurement of the storage stability and the physical properties in Examples 1 to 7 and Comparative Examples 1 to 4 are shown in Table 1.

In addition to the ingredients used in the Examples, other ingredients can be used in the Examples as set forth in the specification to obtain substantially the same results.

TABLE 1

| | Polymer solution | Hardener (part)* | Component D (part)* | Pigment (part)* |
|---|---|---|---|---|
| Ex. 1 | Ref. Ex. 1 | TN801 (0.5) | EtSi (7) | CR-90 (66.7) |
| Ex. 2 | Ref. Ex. 2 | TN801 (0.5) | EtSi (7) | CR-90 (66.7) |
| Ex. 3 | Ref. Ex. 3 | TN801 (0.5) | EtSi (7) | CR-90 (66.7) |
| Com. Ex. 1 | Ref. Ex. 1 | TN801 (0.5) | — | CR-90 (66.7) |
| Ex. 4 | Ref. Ex. 1 | TN801 (0.5) | VTS (7) | Chromofine Blue 4940 (13.0) |
| Ex. 5 | Ref. Ex. 1 | TN801 (0.5) | VTS (7) + AcAc (5) | Chromofine Blue 4940 (13.0) |
| Com. Ex. 2 | Ref. Ex. 1 | TN801 (0.5) | — | Chromofine Blue 4940 (13.0) |
| Ex. 6 | Ref. Ex. 2 | TN801 (0.5) | EtSi (10) + AcAc (5) | Seikafast Red 1547 (16.2) |
| Com. Ex. 3 | Ref. Ex. 2 | TN801 (0.5) | — | Seikafast Red 1547 (16.2) |
| Ex. 7 | Ref. Ex. 3 | TS (0.1) | OF (7) | CR-90 (66.7) |
| Com. Ex. 4 | Ref. Ex. 3 | TS (0.1) | — | CR-90 (66.7) |

| | Composition | | | Pencil hardness | |
|---|---|---|---|---|---|
| | | Viscosity (cP, 25° C.) | | Coating of | Coating of composition |
| | Solid content (%) | Original | After 1 month storage at 50° C. | Gelling time (hour) | original composition | stored for 1 month |
| Ex. 1 | 45 | 25 | 45 | 10 | 2H | 2H |
| Ex. 2 | 45 | 30 | 45 | 10 | H | H |
| Ex. 3 | 45 | 30 | 50 | 10 | H | H |
| Com. Ex. 1 | 45 | 50 | gelled after 4 days | 4 | 2H | —** |
| Ex. 4 | 35 | 25 | 60 | 10 | 2H | 2H |
| Ex. 5 | 35 | 30 | 40 | 24 | 2H | 2H |
| Com. Ex. 2 | 35 | 100 | gelled after 2 days | 4 | 2H | —** |
| Ex. 6 | 35 | 30 | 100 | 24 | H | H |
| Com. Ex. 3 | 35 | 150 | gelled after 1 day | 4 | H | —** |
| Ex. 7 | 45 | 30 | 40 | 8 | H | H |
| Com. Ex. 4 | 45 | 50 | gelled after 4 days | 4 | H | — |

(Notes)
*Part by weight per 100 parts by weight of the polymer
**Measurement was impossible due to gelling during storage

What we claim is:

1. A one component room temperature setting composition which comprises:
   (A) a vinyl polymer having on the polymer chain end or the side chain thereof at least one silyl group having a hydrolyzable group per one polymer molecule, the main chain of the vinyl polymer consisting essentially of a polymer of a vinyl compound; the silyl group-containing vinyl polymer (A) having a number average molecular weight of 1,000 to 10,000 and containing as a comonomer, 0.1 to 10% by weight of units of a vinyl compound having active hydrogen in the form of a group selected from the group consisting of a carboxyl group, an hydroxyl group, an amino group and an acid amido group,
   (B) 0.005 to 10 parts of a hardener,
   (C) 0 to 200 parts of a pigment,
   (D) 0.1 to 100 parts of at least one member selected from the group consisting of a hydrolyzable silicon compound of the general formula:

$$X_{4-n}^{1}\text{---Si---}R_{n}^{2}$$

wherein $R^2$ is an organic group bonded to the silicon atom through a carbon atom, $X^1$ is a hydrolyzable group selected from the group consisting of an alkoxyl group, an alkoxy-alkoxyl group, a phenoxy group, an acyloxyl group, a ketoxymate group, an amino group, an aminoxy group, an acid amide group and an alkenyloxy group, and n is 0 or an integer of 1 to 3, and a partial hydrolysis product of the hydrolyzable silicon compound, and
   (E) 0 to 500 parts of a solvent, said parts being parts by weight per 100 parts by weight of the component (A).

2. The composition of claim 1, wherein said hardener is an organic tin carboxylate.

3. The composition of claim 1, wherein said hardener is an organic tin mercaptide compound having Sn—S bond.

4. The composition of claim 1, wherein the silyl group-containing vinyl polymer (A) contains an alkoxysilyl group as a hydrolyzable silyl group.

5. The composition of claim 1, wherein said hydrolyzable ester compound (D) is ethyl silicate.

* * * * *